US009282404B2

(12) United States Patent
Akino

(10) Patent No.: US 9,282,404 B2
(45) Date of Patent: Mar. 8, 2016

(54) HANDSET MICROPHONE

(71) Applicant: Hiroshi Akino, Tokyo (JP)

(72) Inventor: Hiroshi Akino, Tokyo (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 63 days.

(21) Appl. No.: 14/289,921

(22) Filed: May 29, 2014

(65) Prior Publication Data

US 2014/0376750 A1 Dec. 25, 2014

(30) Foreign Application Priority Data

Jun. 19, 2013 (JP) ................................ 2013-128963

(51) Int. Cl.

| | |
|---|---|
| ***H02B 1/00*** | (2006.01) |
| ***H04R 3/00*** | (2006.01) |
| ***H04R 5/033*** | (2006.01) |
| ***H04R 5/04*** | (2006.01) |
| ***H04R 13/02*** | (2006.01) |

(52) U.S. Cl.

CPC .................. *H04R 3/00* (2013.01); *H04R 3/005* (2013.01); *H04R 3/007* (2013.01); *H04R 5/033* (2013.01); *H04R 5/04* (2013.01); *H04R 13/02* (2013.01); *H04R 2410/00* (2013.01)

(58) Field of Classification Search

None

See application file for complete search history.

(56) References Cited

U.S. PATENT DOCUMENTS

2013/0195283 A1* 8/2013 Larson ................ H04R 1/1041 381/74

FOREIGN PATENT DOCUMENTS

| | | | |
|---|---|---|---|
| GB | 2 420 930 | A * | 6/2006 |
| JP | 3857591 | | 9/2006 |

* cited by examiner

*Primary Examiner* — Muhammad N Edun

(74) *Attorney, Agent, or Firm* — Whitham, Curtis, Christofferson & Cook, P.C.

(57) ABSTRACT

A handset microphone includes: a microphone unit, a first switch for turning on or off the output from the microphone unit, and a second switch for enabling or disabling the output from the microphone unit; the first and second switches have contacts operated by a magnetic field; the contact of the first switch is closed and short-circuits the output terminals while the first switch is being affected by the magnetic field; and the contact of the second switch is opened and disconnects one of the output terminals while the second switch is being affected by the magnetic field.

7 Claims, 4 Drawing Sheets

HANDSET MICROPHONE

TECHNICAL FIELD

The present invention relates to a handset microphone that is free of noise contamination during a switching operation and malfunction due to an external magnetic field.

BACKGROUND ART

Various types of microphones are known that acquire and output sound. One of the types is called a handset microphone, which can transmit speech when a transmission switch is turned on and cannot transmit speech when the transmission switch is turned off (see Japanese Patent No. 3857591). The transmission switch of a handset microphone is generally implemented by, for example, a push switch. The push switch of the handset microphone is continued to be pressed during speech transmission. The push switch is returned to the original state (i.e., not pressed) to stop speech transmission. The contact of the push switch is mechanically opened or closed.

Mechanical turning on/off operation of the contact of the switch readily generates noise. In order to prevent such noise contamination, mechanical contact may be replaced with a reed switch openable or closable by the movement of a magnet attached to a switch knob.

Use of a reed switch as an operation switch of a handset microphone can prevent noise caused at a start or stop operation of speech transmission. A reed switch having contact operated by a magnetic field may however malfunction in an unintentional magnetic field from the exterior.

Handset microphones are often used for radio communication machines and usually transmit radio waves in cooperation with switch operations. In such a radio communication machine, a malfunction of the switch in the handset microphone is caused by an external magnetic field and then leads to undesirable transmission of radio waves.

SUMMARY OF INVENTION

Technical Problem

It is an object of the present invention to provide a handset microphone that is free of noise contamination during a switching operation and malfunction due to an external magnetic field.

Solution to Problem

According to an aspect of the present invention, a handset microphone includes a microphone unit, a first switch for turning on or off the output from the microphone unit, and a second switch for enabling or disabling the output from the microphone unit; the first and second switches have contacts operated by a magnetic field; the contact of the first switch is closed and short-circuits the output terminals while the first switch is being affected by the magnetic field; and one of the contacts of the second switch is opened and disconnects one of the output terminals while the second switch is being affected by the magnetic field.

Advantageous Effects of Invention

A handset microphone according to an aspect of the present invention is free of noise contamination during a switching operation and malfunction due to an external magnetic field.

DESCRIPTION OF EMBODIMENTS

Figure 1:
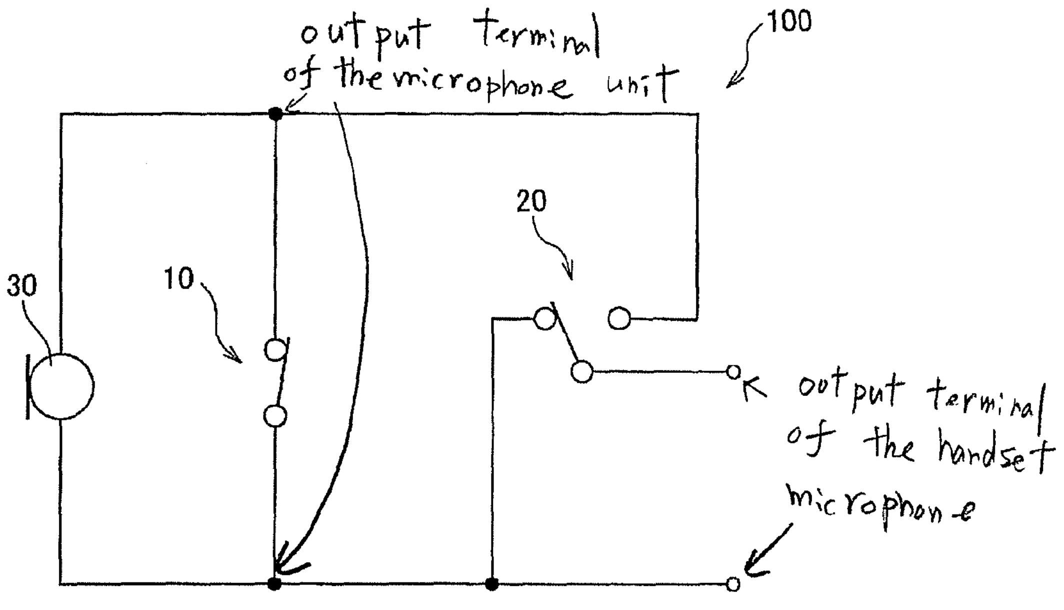
FIG. 1 is a circuit diagram illustrating a handset microphone an embodiment of the present invention.

A handset microphone according to an embodiment of the present invention will now be described with reference to the accompanying drawings. FIG. 1 is a circuit diagram illustrating a configuration of the handset microphone 100 according to the embodiment. As illustrated in FIG. 1, the handset microphone 100 includes a dynamic microphone unit 30, a transmission switch (a first switch) 10, and a hook switch (a second switch) 20.

The transmission switch 10 is a reed switch having a mechanism for moving position of a magnet in synchronization with the operation of an operational unit (not illustrated) of the handset microphone 100. During the quiescent state of the operational unit, the contact of the reed switch is magnetized by a magnetic field from the magnet. The contact of the transmission switch 10 is closed by the magnetic field. If no magnetic field is applied from the magnet, the contact of the transmission switch 10 is opened. That is, the transmission switch is a make-contact reed switch.

As illustrated in FIG. 1, the transmission switch 10 is connected in parallel to output terminals of the microphone unit 30. If the operational unit of the handset microphone 100 is not operated (for example, not pressed), the transmission switch 10 has a magnetic field generated by the magnet positioned near the contact. At this time, the contact of the transmission switch 10 is closed to short-circuit the output terminals of the microphone unit 30.

If the operational unit of the handset microphone 100 is operated (for example, pressed), the magnet recedes from the contact. As a result, the contact is not affected by the magnetic field, then the contact is opened. In other words, if the operational unit is operated, speech signals are output from the output terminals of the microphone unit 30 depending on the state of the hook switch 20 described below.

More specifically, the output of the speech signals from the handset microphone 100 is switched by the transmission switch 10.

The hook switch 20 is a transfer contact reed switch and is switched from a normally closed contact to a normally open contact by the magnetic field. FIG. 1 illustrates the hook switch 20 affected by the magnetic field, i.e., switched to the normally open contact. The magnetic field affecting the hook switch 20 is generated by, for example, a magnet provided in a hook for holding the handset microphone 100 during non-use.

The handset microphone 100 includes a housing (not illustrated) accommodating several components, such as the microphone unit 30, the transmission switch 10, and the hook switch 20 in the handset microphone 100. The housing has a hanging member for hanging the housing on a wall. The wall has a prefixed hook or holding member provided with a magnet. When the handset microphone 100 is not used, the hanging member is put on the hook (the holding member). The hook switch 20 is shifted to the normally open contact by the magnetic field from the magnet and maintains this state. In other words, the handset microphone 100 has output terminals opened or closed by the hook switch 20.

The hanging member of the housing of the handset microphone 100 is, for example, a hole provided in the housing. The hook (the holding member) is engageable with the hole in the housing to fix the handset microphone 100.

The handset microphone 100 can be switched with the hook switch 20 between the outputtable state and the output cutoff state. FIG. 1 illustrates a quiescent state in which the handset microphone 100 does not transmit speech. At this time, the output terminals of the microphone unit 30 are short-circuited by the transmission switch 10. The normally closed contact of the hook switch 20 is electrically disconnected from the output terminals of the microphone unit 30. As a result, no signals are output from the microphone unit 30.

Figure 3A:
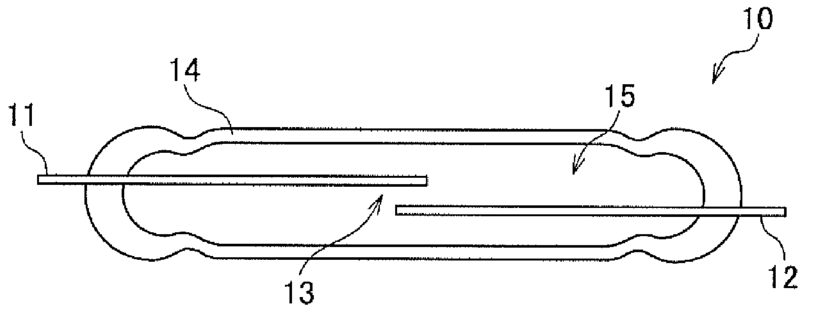
FIG. 3A illustrates an example transmission switch of the handset microphone in which the transmission switch is not operated.
Figure 3B:
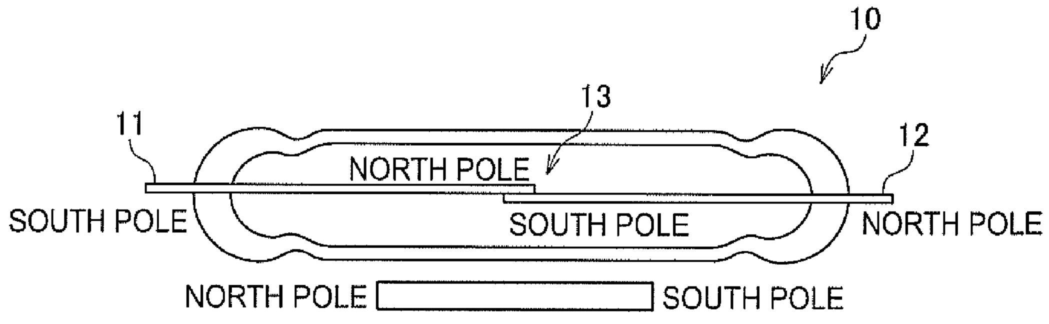
FIG. 3B illustrates an operated state of the transmission switch.

A configuration of the transmission switch 10 will now be described in detail. FIGS. 3A and 3B illustrate an example reed switch used as the transmission switch 10. FIG. 3A illustrates a quiescent state of the transmission switch 10. FIG. 3B illustrates an operated state of the transmission switch 10.

As illustrated in FIG. 3A, the transmission switch 10 includes two ferromagnetic reeds facing each other at a predetermined distance and enclosed in a glass tube 14. In the transmission switch 10, a magnetic field applied from the exterior in the axial direction of the reeds magnetizes a first reed 11 and a second reed 12 to cause their facing free ends to attract and contact each other. This mechanism closes the circuit at a contact portion 13. If no magnetic field is applied, the contact portion 13 is opened by the resilience of each reed to open the circuit. The glass tube 14 is filled with inert gas 15 to prevent activation of the contact portion 13.

In the transmission switch 10, the magnet is positioned so as to apply a magnetic field to the contact portion 13 when the operational unit is not operated, and so as to apply no magnetic field to the contact portion 13 when the operational unit is operated.

Figure 4A:
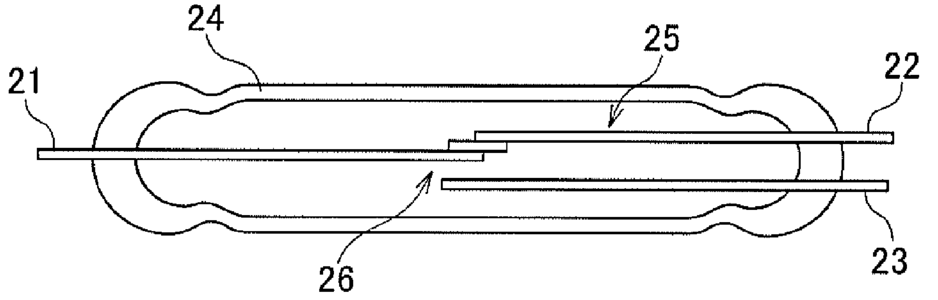
FIG. 4A illustrates an example hook switch of the handset microphone in which the hook switch is not operated.
Figure 4B:
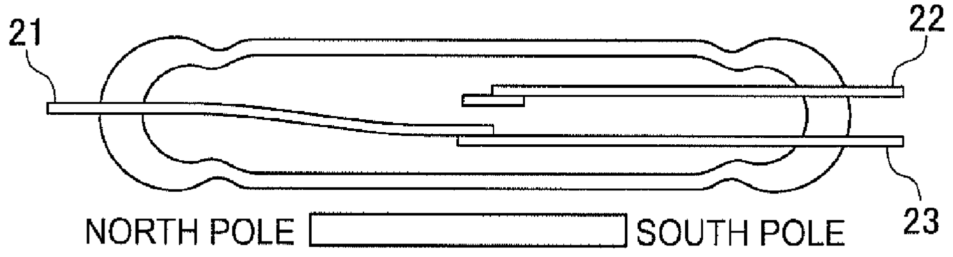
FIG. 4B illustrates an operated state of the hook switch.

A configuration of the hook switch 20 will now be described. FIGS. 4A and 4B illustrate an example reed switch used as the hook switch 20. FIG. 4A illustrates the hook switch 20 not affected by any magnetic field. FIG. 4B illustrates the hook switch 20 affected by a magnetic field.

The hook switch 20 includes a single reed and two reeds facing the single reed at a predetermined distance, all the reeds being enclosed in a glass tube 24. Two of the three reeds are ferromagnetic, one is a common (COM) reed 21, and the other is a normally open (NO) contact reed 23. The remaining one is a normally closed (NC) contact reed 22 having a nonmagnetic free end. The glass tube 24 is filled with inert gas 25 to prevent activation of the contact portion 26.

As illustrated in FIG. 4A, when no magnetic field is applied to the hook switch 20, the contact portion 26 at the free end of the COM reed 21 is in contact with the free end of the NC reed 22 due to mechanical biasing force of the COM reed 21. As illustrated in FIG. 4B, when an external magnetic field is applied in the axial direction of the reeds of the hook switch 20, the COM reed 21 and the NO reed 23 are magnetized to mutually attract the facing free ends. The contact portion 26 at the free end of the COM reed 21 comes into contact with the free end of the NO reed 23 to close the circuit.

Figure 2A:
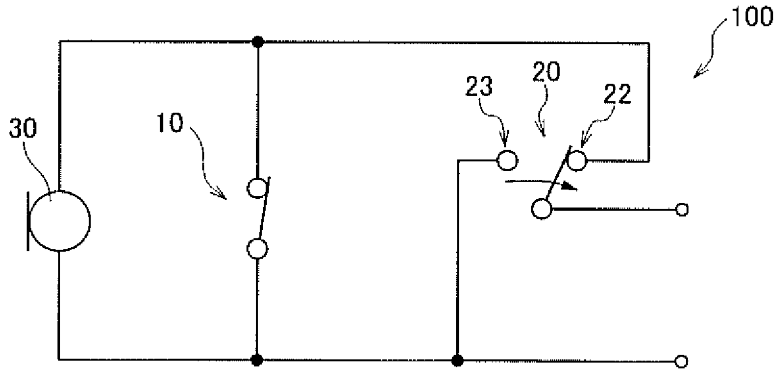
FIG. 2A is a circuit diagram illustrating a preparative state for the handset microphone.
Figure 2B:
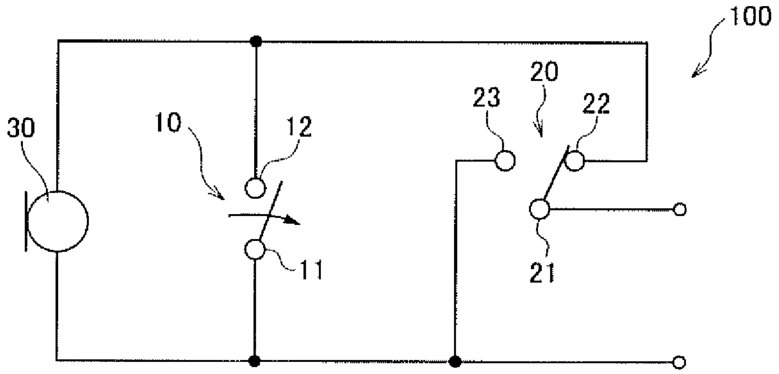
FIG. 2B is a circuit diagram illustrating an operational state for the handset microphone.
Figure 2C:
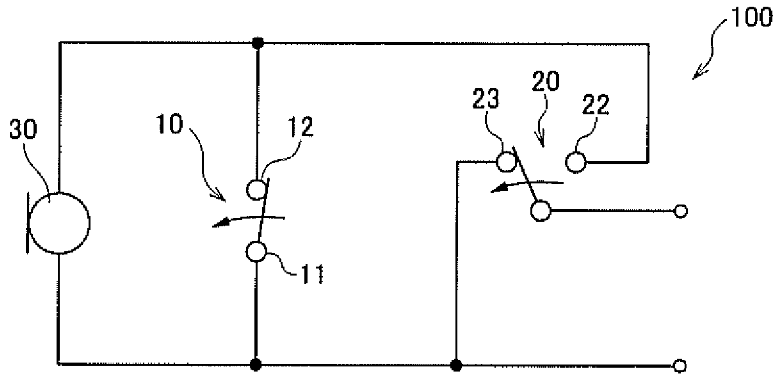
FIG. 2C is a circuit diagram illustrating an operated state of the handset microphone affected by an external magnetic field.

The operation of the handset microphone 100 will now be explained. FIG. 2A is a circuit diagram illustrating a preparative state for the handset microphone 100. FIG. 2B is a circuit diagram illustrating an operational state for the handset microphone 100. FIG. 2C is a circuit diagram illustrating the operated handset microphone 100 affected by an external magnetic field.

The handset microphone 100 described in FIG. 1 is held on the hook (not illustrated). The COM reed 21 of the hook switch 20 is in contact with the NO reed 23 due to attractive force by the magnet in the hook. This state changes to an operational state illustrated in FIG. 2A if the handset microphone 100 is lifted from the hook. In other words, the COM reed 21 of the hook switch 20 comes into contact with the NC reed 22. The output terminals of the microphone unit 30 are thereby connected to the output terminals of the handset microphone 100 through the hook switch 20. The output terminals of the microphone unit 30 however are short-circuited through the transmission switch 10 to disable the output signals from the microphone unit 30.

The transmission switch 10 is then operated and changed to a speech transmission state in FIG. 2B. More specifically, the operational unit (not illustrated) is pressed to repel a magnetic field applied to the transmission switch 10, and the contact is then opened between the first and second reeds 11 and 12. This enables signals to be output from the microphone unit 30 through the hook switch 20.

The state illustrated in FIG. 2B changes to the state illustrated in FIG. 2C if an unexpected external magnetic field is applied to the transmission switch 10 and the hook switch 20. If an external magnetic field is applied to the transmission switch 10, the first reed 11 comes into contact with the second reed 12 to short-circuit the output terminals of the microphone unit 30 as illustrated in FIG. 2C. This disables the output from the microphone unit 30. If an external magnetic field is applied to the hook switch 20, the contact destination of the COM reed 21 is switched from the NC reed 22 to the NO reed 23. This disables the output from the microphone unit 30.

FIG. 2C illustrates both the transmission switch 10 and the hook switch 20 affected by an external magnetic field. In the present invention, if an external magnetic field is applied to either the transmission switch 10 or the hook switch 20, the output from the microphone unit 30 is interrupted.

The handset microphone 100 described above includes the hook switch 20 and the transmission switch 10, which are implemented by the reed switches. This configuration is free of noise contamination during a switching operation and malfunction due to an external magnetic field.

What is claimed is:

1. A handset microphone comprising:

a microphone unit;

a first switch connected in parallel to output terminals of the microphone unit; and a second switch which is a transfer contact switch and is in contact with a normally open contact and a normally closed contact for opening and closing a circuit of the output terminals and output terminals of the handset microphone, wherein the first and second switches have contacts opened or closed by a magnetic field;

the contact of the first switch is closed and short-circuits the output terminals while the first switch is being affected by the magnetic field; and the contacts of the second switch is in contact with the normally closed contact and connects one of the output terminals of the microphone unit to one of the output terminals of the handset microphone through the second switch while the second switch is being not affected by any magnetic field, and is in contact with the normally open contact and disconnects the one of the output terminals of the microphone unit and the one of the output terminals of the handset microphone while the second switch is being affected by the magnetic field.

2. The handset microphone according to claim 1, wherein the contact of the first switch is opened while the first switch is being affected by no magnetic field.

3. The handset microphone according to claim 1, wherein the normally open contact connected to other one of the output terminals of the microphone unit and the other one of the output terminals of the handset microphone.

4. The handset microphone according to claim 1, further comprising a housing accommodating components constituting the handset microphone and a holding member for holding the housing, wherein the housing is held on and is detachable from the holding member; and the holding member includes a magnet applying a magnetic field to the second switch to open the contact of the second switch while the housing is held on the holding member.

5. The handset microphone according to claim 4, wherein the holding member is a hook engageable with a hole provided in the housing.

6. A handset microphone comprising:

a microphone unit;

a first switch connected in parallel to output terminals of the microphone unit;

a second switch for opening and closing the output terminals, wherein the first and second switches have contacts opened or closed by a magnetic field;

the contact of the first switch is closed and short-circuits the output terminals while the first switch is being affected by the magnetic field; and the contacts of the second switch is open and disconnects one of the output terminals while the second switch is being affected by the magnetic field; and a housing accommodating components constituting the handset microphone and a holding member for holding the housing, wherein the housing is held on and is detachable from the holding member; and the holding member includes a magnet applying a magnetic field to the second switch to open the contact of the second switch while the housing is held on the holding member.

7. The handset microphone according to claim 6, wherein the holding member is a hook engageable with a hole provided in the housing.

* * * * *